(12) United States Patent
Crepeau

(10) Patent No.: US 6,329,423 B1
(45) Date of Patent: Dec. 11, 2001

(54) STABLE LIQUID FORMULATIONS OF HIGH VITAMIN E CONTENT

(75) Inventor: Michel Andre Crepeau, Pueblo West, CO (US)

(73) Assignee: Aventis Animal Nutrition, S.A., Antony Cedex (FR)

( * ) Notice: Subject to any disclaimer, the term of this patent is extended or adjusted under 35 U.S.C. 154(b) by 0 days.

(21) Appl. No.: 09/590,804

(22) Filed: Jun. 9, 2000

(51) Int. Cl.[7] ................................................ A61K 31/355
(52) U.S. Cl. ............................................................ 514/458
(58) Field of Search ............................................... 514/458

*Primary Examiner*—Dwayne C. Jones
(74) *Attorney, Agent, or Firm*—Connolly Bove Lodge and Hutz LLP

(57) ABSTRACT

A stable liquid vitamin E formulation having at least 60 wt % vitamin E comprises water, potassium sorbate, propylene glycol, 1-propanol, polyethylene glycol 400 monooleate and vitamin E oil. The formulation is free of polyoxyethylene sorbitan monooleate and has a viscosity at 20° C. of less than about 1000 cPs.

4 Claims, No Drawings

STABLE LIQUID FORMULATIONS OF HIGH VITAMIN E CONTENT

FIELD OF THE INVENTION

This invention relates to stable liquid formulations having a high vitamin E oil content.

BACKGROUND OF THE INVENTION

The art has long been concerned with finding a suitable way of rendering liquid-soluble vitamins suitably dispensable in aqueous media. For this purpose, various emulsifiers and dispersing agents have been employed. In this regard, those in this field have employed polyoxyethylene derivatives of high molecular weight fatty acid esters, such as polyoxyethylene sorbitan monooleate, as a suitable dispersing agent. However, using the heretofore proposed emulsifier and dispersants, those in the art have only been able to produce stable formulations of vitamin E that contain concentrations of vitamin E of from about 40 wt % to 50 wt %. At higher concentrations, the formulations are undesirably viscous at low temperatures of 20° C. or less and fail to disperse adequately in aqueous media in their intended use environment. However, the relevant industry has indicated a need for a liquid vitamin E formulation that contains at least about 60 wt % or more of vitamin E oil and which formulation remains stable, i.e., clear and free of separation, possesses good viscosity characteristics at low temperatures (20° C. or less), and disperses readily in aqueous media.

SUMMARY OF THE INVENTION

It is therefore an object of this invention to provide a stable liquid vitamin E formulation containing at least about 60 wt % at vitamin E oil, such formulation being characterized by a viscosity at 20° C. of less than about 1000 cPs, preferably less than about 500 cPs, and which disperses readily in aqueous media.

The stable liquid vitamin E formulation of this invention comprises:

a) an aqueous phase comprising:
  1) from about 0.5 to about 3 wt % water,
  2) from about 0.05 to 0.15 wt % to potassium sorbate,
  3) from about 0.3 to about 0.7 wt % propylene glycol, and
  4) from about 15% about 20 wt % 1-propanol, and b) an oil phase comprising:
  5) from about 12 to about 17 wt % polyethylene glycol 400 monooleate, and
  6) from about 60 to about 70 wt % vitamin E oil;

wherein the formulation is free of polyoxyethylene sorbitan monooleate, the wt % is based on the total weight of the formulation, and the viscosity of the formulation at 20° C. is less than about 1000 cPs, preferably less than about 500 cPs.

DETAILED DESCRIPTION OF THE INVENTION

It has been discovered that a stable liquid vitamin E formulation containing at least about 60 wt % vitamin E oil can be obtained if the formulation is free of polyoxyethylene sorbitan monooleate and has the hereinbefore recited components present in the amounts specified. These formulations are stable over extended periods of time without separation occurring or the formulation becoming cloudy. Additionally, these formulations remain stable in regard to potency for extended periods of time at room and elevated temperatures.

The stable liquid vitamin E formulations of this invention may have any soluble vitamin E oil present, either a synthetic or natural vitamin E, oil at a concentration of at least about 60 wt %, preferably from about 60 to about 70 wt %.

A preferred stable liquid vitamin E formulation of this invention comprises: about 2 wt % water, about 0.1 wt % potassium sorbate, about 0.5 wt % propylene glycol, about 19.5 wt % 1-propanol, about 13 wt % polyethylene glycol 400 monooleate and about 60 to about 65 wt % vitamin E oil.

The stable liquid vitamin E formulations of this invention are prepared by blending the oil soluble vitamin E oil with the polyethylene glycol 400 monooleate to produce a substantially homogenous oil phase. An aqueous phase is prepared by adding and uniformly mixing potassium sorbate, propylene glycol and 1-propanol with water. Then the oil and water phases are blended together to produce the stable liquid formulations.

The formulation of this invention, optionally may have added to them other conventional ingredients, usually added to the oil phase, such as for example, minor amount of sweeteners, flavoring agents, antioxidants, feed supplements, stabilizers and the like. As examples of antioxidants that may be employed there can be mentioned ethoxyquin (6-ethoxy-1,2-dihydro-2,2,4-trimethylquinoline) and BHT (2,6-di-t-butyl-peresol).

As an example of a stable liquid vitamin E formulation of this invention, there may be mentioned the following illustrative formulation and its preparation. An organic oil phase is provided by blending 1,440.4 pounds of vitamin E oil (topcopheryl acetate 94.5% potency) with 286 pounds of Alkamuls 400-MO (polyethylene glycol 400 monooleate). An aqueous phase is provided by mixing together 2 pounds potassium sorbate, 11 pounds of propylene glycol, 432 pounds of 1-propanol and 44 pounds of water. The oil and aqueous phases are then blended together to produce a stable liquid vitamin E formulation of this invention comprising 2 wt % water, 0.1 wt % potassium sorbate, 0.5 wt % propylene glycol, 19.5 wt % 1-propanol, 12.9 wt % polyethylene glycol 400 monooleate and 65 wt % vitamin E oil. The stable formulation had a vitamin E potency of about 614 IU/g.

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. A stable liquid vitamin E formulation containing at least about 60 weight percent vitamin E oil, the formulation having a viscosity of less than about 1000 cPs at 20° C., the formulation comprising:

a) an aqueous phase comprising:
  1) from about 0.5 to about 3 wt % water;
  2) from about 0.05 to 0.15 wt % potassium sorbate;
  3) from about 0.3 or about 0.7 wt % propylene glycol, and
  4) from about 15 to about 20 wt % 1-propanol, and b) an oil phase comprising:
  5) from about 12 to about 17 wt % polyethylene glycol 400 monooleate; and
  6) from about 60 to about 70 wt % vitamin E oil;

wherein said formulation is free of polyoxyethylene sorbitan monooleate; the weight % being based on the total weight of the formulation.

2. A formulation according to claim 1 comprising:

about 2 wt % water, about 0.1 wt % potassium sorbate, about 0.5 wt % propylene glycol, about 19.5 wt % 1-propanol, about 13 wt % polyethylene glycol 400 monooleate, and about 60 to about 65 wt % vitamin E oil.

3. A formulation according to claim 1 wherein the formulation has a viscosity of 20° C. of less than about 500 cPs.

4. A formulation according to claim 2 wherein the formulation has a viscosity of 20° C. of less than about 500 cPs.

* * * * *